(12) United States Patent  
Fu et al.

(10) Patent No.: US 7,492,616 B2
(45) Date of Patent: Feb. 17, 2009

(54) MODULATION CONTROLLER, METHOD OF CONTROLLING AND THREE PHASE CONVERTER SYSTEM EMPLOYING THE SAME

(75) Inventors: Minghua Fu, Plano, TX (US); Zhenxue Xu, Murphy, TX (US); George Ulaner, Dallas, TX (US)

(73) Assignee: Lineage Power Corporation, Mesquite, TX (US)

( * ) Notice: Subject to any disclaimer, the term of this patent is extended or adjusted under 35 U.S.C. 154(b) by 417 days.

(21) Appl. No.: 11/089,780

(22) Filed: Mar. 25, 2005

(65) Prior Publication Data

US 2006/0215430 A1    Sep. 28, 2006

(51) Int. Cl.
*H02M 1/12*    (2006.01)
(52) U.S. Cl. .......................................... 363/40; 363/44
(58) Field of Classification Search .................. 363/34, 363/37, 39, 40, 44, 45, 101
See application file for complete search history.

(56) References Cited

U.S. PATENT DOCUMENTS

| | | | | |
|---|---|---|---|---|
| 4,719,550 A * | 1/1988 | Powell et al. | ................. | 363/37 |
| 5,345,375 A * | 9/1994 | Mohan | ........................ | 363/40 |
| 5,495,160 A * | 2/1996 | Pond | ........................... | 318/801 |
| 5,499,178 A * | 3/1996 | Mohan | ........................ | 363/39 |
| 5,982,645 A * | 11/1999 | Levran et al. | ................... | 363/37 |
| 6,760,239 B2 * | 7/2004 | Schierling et al. | ........... | 363/132 |
| 6,958,586 B2 * | 10/2005 | Tanimoto | .................... | 318/254 |
| 2006/0055362 A1 * | 3/2006 | Tobari et al. | ................ | 318/716 |

* cited by examiner

*Primary Examiner*—Adolf Berhane (57) ABSTRACT

The present invention provides a modulation controller for use with a three phase converter. In one embodiment, the modulation controller includes a three phase modulator configured to provide vector control signals for the three phase converter that generate a common mode voltage. Additionally, the modulation controller also includes a transition modifier coupled to the three phase modulator and configured to provide a shaping function for the vector control signals that extends a transition period of the common mode voltage.

24 Claims, 8 Drawing Sheets

MODULATION CONTROLLER, METHOD OF CONTROLLING AND THREE PHASE CONVERTER SYSTEM EMPLOYING THE SAME

TECHNICAL FIELD OF THE INVENTION

The present invention is directed, in general, to power conversion and, more specifically, to a modulation controller, a method of controlling a common mode noise and a three phase converter system employing the controller or the method.

BACKGROUND OF THE INVENTION

Vector control is a widely used technique in three phase converter topologies where power flow may be bidirectional (i.e., used as a rectifier or an inverter) due to its high performance characteristics. In vector control, two pulse width modulation (PWM) schemes are often used. One is a traditional sine/Δmodulation (sine/ΔPWM), and the other is space vector PWM (SVPWM). With the progress of digital control technology, SVPWM has drawn more interests since as it has an advantage of accommodating wider AC voltage ranges for a fixed DC bus voltage. Additionally, SVPWM may provide a reduced switching frequency for comparable ripple performance, thereby resulting in critical thermal benefits. Additionally, SVPWM can be implemented by employing either a hardware or software approach.

While generally, good current waveforms are not difficult to obtain, the application of SVPWM in products has been very limited due to its large common mode noise. In rectifier applications, this common mode noise causes serious electromagnetic interference (EMI) and stability problems for the converter. In motor drive applications, it could cause bearing damage due to common mode current. In the case of parallel operation of multiple converters, a circulation current, caused by the common mode voltage, could disturb the power train and sometimes even damage the converter devices. Although larger common mode filters will help reduce the noise, they are often limited by their size and cost penalties. Additionally, common mode filters merely attenuate the noise rather than resolve the source of the noise.

Accordingly, what is needed in the art is a more effective way to reduce common mode noise associated with three phase converters.

SUMMARY OF THE INVENTION

To address the above-discussed deficiencies of the prior art, the present invention provides a modulation controller for use with a three phase converter. In one embodiment, the modulation controller includes a three phase modulator configured to provide vector control signals for the three phase converter that generate a common mode voltage. Additionally, the modulation controller also includes a transition modifier coupled to the three phase modulator and configured to provide a shaping function for the vector control signals that extends a transition period of the common mode voltage.

In another aspect, the present invention provides a method of controlling a common mode noise for use with a three phase converter. The method includes providing vector control signals for the three phase converter that generate a common mode voltage and further providing a shaping function for the vector control signals that extends a transition period of the common mode voltage.

The present invention also provides, in yet another aspect, a three phase converter system. The three phase converter system includes a three phase bidirectional converter and a modulation controller coupled to the three phase bidirectional converter. The modulation controller includes a three phase modulator that provides vector control signals for the three phase bidirectional converter and generates a common mode voltage. The modulation controller also includes a transition modifier, coupled to the three phase modulator, that provides a shaping function for the vector control signals and extends a transition period of the common mode voltage.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
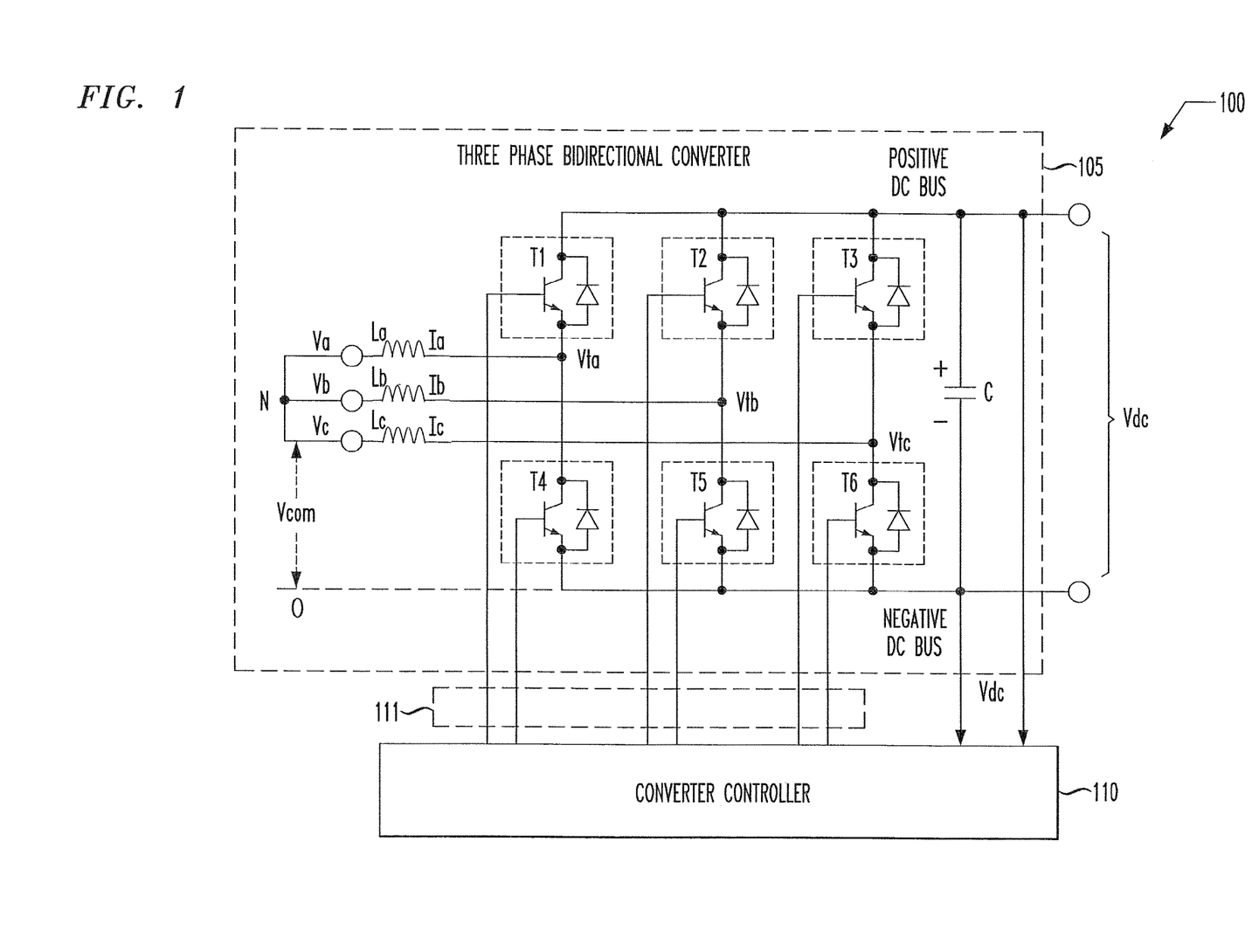
FIG. 1 illustrates a system diagram of an embodiment of a three phase converter system constructed in accordance with the principles of the present invention.

Referring initially to FIG. 1, illustrated is a system diagram of an embodiment of a three phase converter system, generally designated 100, constructed in accordance with the principles of the present invention. The three phase converter system 100 includes a three phase bidirectional converter 105 and a converter controller 110. The three phase bidirectional converter 105 employs first, second and third phase voltages Va, Vb, Vc to provide a DC output voltage $V_{dc}$. In alternative embodiments, the three phase bidirectional converter 105 may employ the DC output voltage $V_{dc}$ to provide first, second and third phase voltages Va, Vb, Vc.

The three phase bidirectional converter 105 includes first, second and third boost inductors La, Lb, Lc, first, second and third positive voltage switches T1, T2, T3, first, second and third negative voltage switches T4, T5, T6 and a filter capacitor C. The three phase bidirectional converter 105 operates as a boost converter and provides power factor correction that supplies substantially sinusoidal AC currents Ia, Ib, Ic. Conduction of the positive and negative voltage rectifiers T1-T6 is controlled by the converter controller 110 employing vector control signals 111. Alternatively, the three phase bidirectional converter can also operate as an inverter.

In the illustrated embodiment, the three phase bidirectional converter 100 generates a common mode voltage $V_{com}$ between an AC neutral point N and a DC voltage bus O, as shown. The common mode voltage $V_{com}$ occurs as a rectangular waveform having a period of one third of the fundamental period of the three phase voltages Va, Vb, Vc, which in itself is not a problem. However, a common mode noise associated with switching of the common mode voltage $V_{com}$ can exceed requirements if not appropriately managed. The vector control signals 111 employ a "soft" space vector pulse width modulation (SVPWM) scheme, which extends a transition period of the common mode voltage $V_{com}$ thereby allowing management of the root cause of an electromagnetic interference (EMI). Since the source of the common mode noise is reduced, relatively smaller EMI filters may be used or perhaps eliminated altogether.

Figure 2:
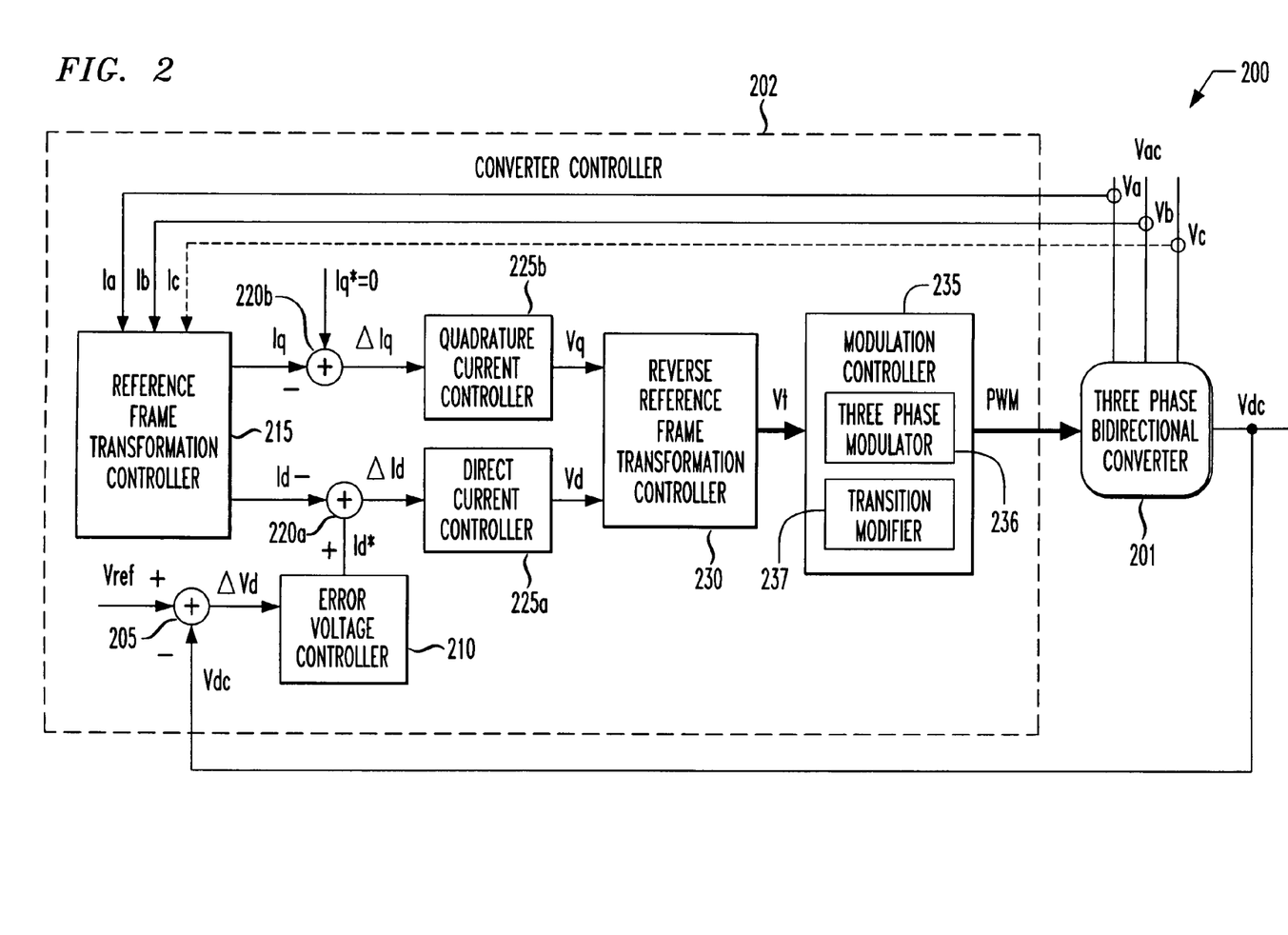
FIG. 2 illustrates an alternative diagram of a three phase converter system constructed in accordance with the principles of the present invention.

Turning now to FIG. 2, illustrated is an alternative diagram of a three phase converter system, generally designated 200, constructed in accordance with the principles of the present invention. The three phase converter system 200 includes a three phase bidirectional converter 201 and a converter controller 202 coupled to it. The three phase bidirectional converter 201 converts three phase voltages Va, Vb, Vc into a DC output voltage $V_{dc}$ as discussed with respect to FIG. 1. FIG. 2 provides a more detailed operation of the converter controller 202, which is implemented in a digital signal processor (DSP) in the illustrated embodiment.

The converter controller 202 includes first, second and third summing junctions 205, 220a, 220b, an error voltage controller 210, a reference frame transformation controller 215, a direct current controller 225a, a quadrature current controller 225b, a reverse reference frame transformation controller 230 and a modulation controller 235. The first summing junction 205 provides an error voltage $\Delta V_d$, which is a difference between the DC output voltage $V_{dc}$ and a reference voltage $V_{ref}$. The reference voltage $V_{ref}$ is about 400 volts and determines the DC output voltage $V_{dc}$. The error voltage controller 210 converts the error voltage $\Delta V_d$ into a direct reference current $I_d^*$ that is provided to the second summing junction 220a.

The reference frame transformation controller 215 senses first and second AC phase currents Ia, Ib and provides direct and quadrature reference frame currents Id, Iq based on the first, second and third AC phase currents Ia, Ib, Ic, since the third AC phase current Ic may be calculated knowing the first and second AC phase currents Ia, Ib. The second summing junction 220a provides a direct error current $\Delta I_d$, which is a difference between the direct reference current $I_d^*$ and the direct reference frame current Id. Correspondingly, the third summing junction 220b provides a quadrature error current $\Delta I_q$, which is a difference between a quadrature reference current $I_q^*$ and the quadrature reference frame current Iq. In this embodiment, the quadrature reference frame current Iq is set to zero, as shown.

The direct and quadrature current controllers 225a, 225b provide direct and quadrature modulation voltages Vd, Vq, to the reverse reference frame transformation controller 230, employing the direct and quadrature error currents $\Delta I_d$, $\Delta I_q$. The reverse reference frame transformation controller 230 employs the direct and quadrature modulation voltages Vd, Vq to provide a terminal voltage vector $V_t$ to the modulation controller 235.

The modulation controller 235 includes a three phase modulator 236 and a transition modifier 237. The three phase modulator 236 is configured to provide vector control signals PWM for the three phase bidirectional converter 201 that generate a common mode voltage, as discussed with respect to FIG. 1. The transition modifier 237 is configured to provide a shaping function for the vector control signals PWM that extends transition periods of the common mode voltage, thereby reducing a common mode EMI noise level to an acceptable level.

Figure 3:
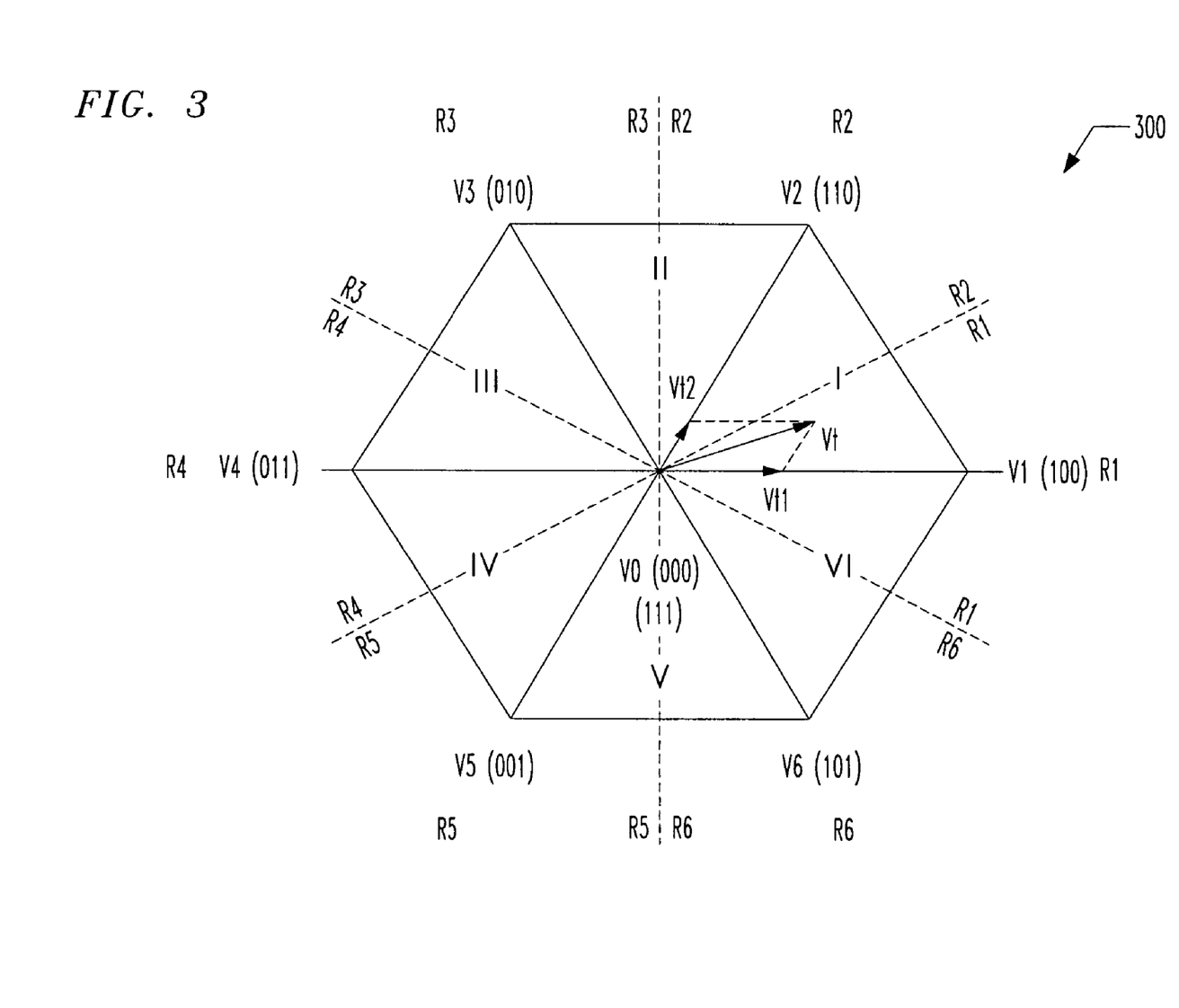
FIG. 3 illustrates a diagram of an embodiment of a space vector representation that is provided by a modulation controller as discussed with respect to FIG. 2.

Turning now to FIG. 3, illustrated is a diagram of an embodiment of a space vector representation, generally designated 300, that is provided by a modulation controller as discussed with respect to FIG. 2. The space vector representation 300 includes a terminal voltage vector $V_t$ that rotates through first, second, third, fourth, fifth and sixth regions R1, R2, R3, R4, R5, R6, wherein each region corresponds to 60 degrees of rotation. The space vector representation 300 also includes first, second, third, fourth, fifth and sixth sectors I, II, III, IV, V, VI, wherein each sector also corresponds to 60 degrees of rotation. Each of the six sectors corresponds to two vectors shown at the corners of each sector and one of two representations of a zero vector shown at the origin.

A PWM switching pattern for a three phase converter, such as the three phase bidirectional converter of FIG. 1, may be obtained based on a location of the terminal voltage vector $V_t$. For example, if the terminal voltage vector $V_t$ is located in sector I, as shown in FIG. 3, it is composed of first and second switching vectors V1(100), V2(110) and a first zero switching vector V0(000) or a second zero switching vector V0(111). A switching period $t_s$ consists of zero, first and second switching periods $t_0$, $t_1$, $t_2$ in this sector. Therefore, during one of the switching periods $t_s$ in sector I, the first switching vector V1(100) is active for the first period $t_1$, the second switching vector V2(110) is active for the second period $t_2$ and the first or second zero switching vector V0(000), V0(111) is active for a remainder of the switching period $t_S$, corresponding to the zero switching period $t_0$.

In order to minimize switching losses, only switches of two phases, associated with the three voltage phases in a three phase converter, are allowed to switch in any switching cycle. Correspondingly, switches of one phase are not switching (i.e., one side is always conducting) in any switching cycle. Additionally, in the six regions R1-R6 each phase stops switching alternately. The first and second zero switching vectors V0(000), V0(111) alternate in the six regions R1-R6 such that the two phase switching pattern is satisfied.

Figure 4:
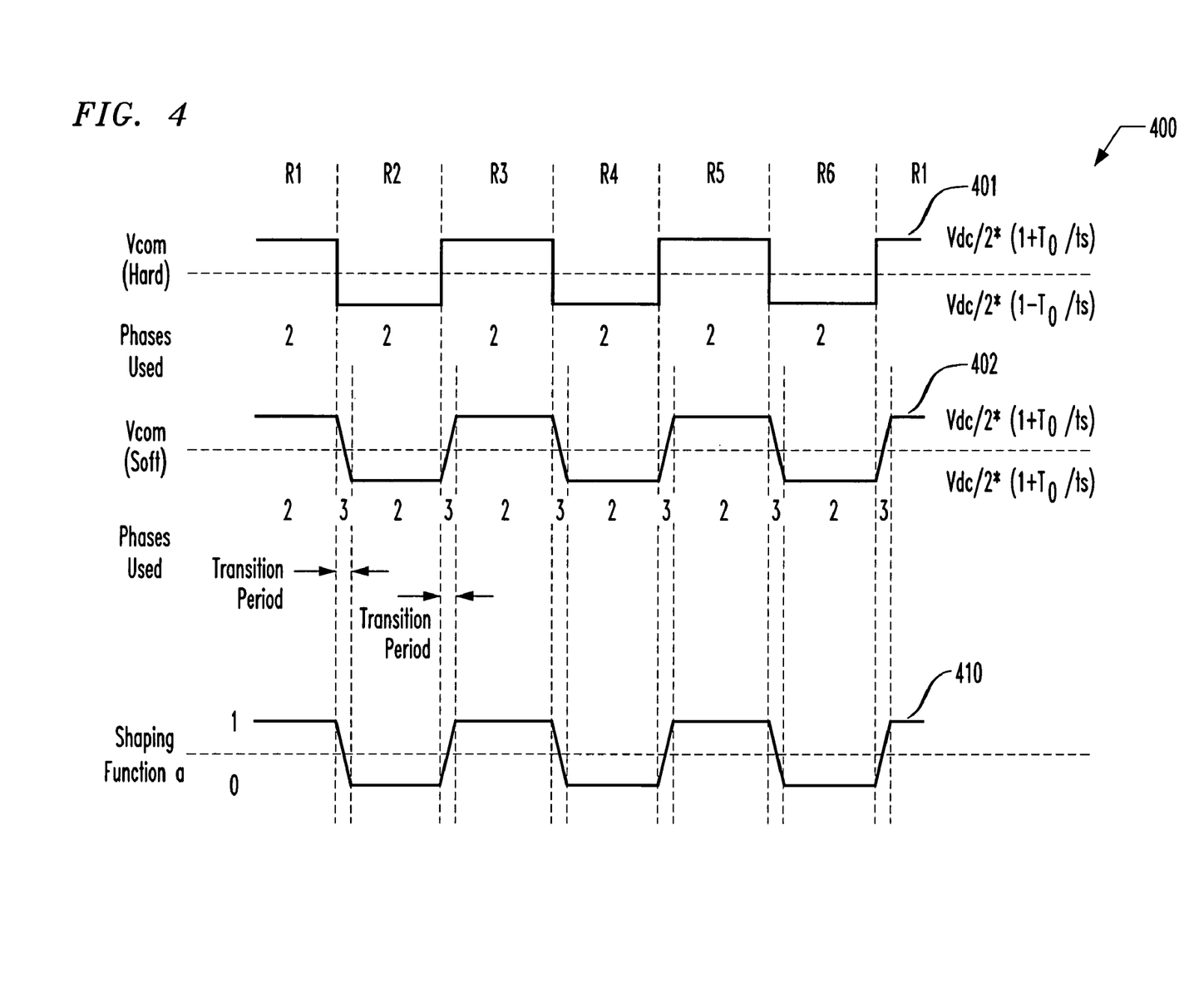
FIG. 4 illustrates a waveform diagram showing common mode voltage and shaping function waveforms.

Turning now to FIG. 4, illustrated is a waveform diagram, generally designated 400, showing common mode voltage and shaping function waveforms. The waveform diagram 400 includes a typical unshaped common mode voltage waveform 401, as well as a shaped common mode voltage waveform 402 and a shaping function waveform 410 constructed in accordance with the principles of the present invention.

The unshaped common mode voltage waveform 401 provides abrupt common mode voltage transitions when the space vector discussed with respect to FIG. 3 transitions from one region to the next, as shown in FIG. 4. These abrupt transitions tend to generate large common mode noise and currents. In contrast, the shaped common mode voltage waveform 402, employing the shaping function 410, extends the transition periods of the common mode voltage thereby managing a "soft" transition and reducing common mode noise and currents. This is of particular significance when paralleling converters since circulation current will occur between the converters.

Generally, the common mode voltage in a three phase converter, as presented in FIG. 1, may be represented by equation (1) below:

$$V_{com} = \frac{1}{3}(V_{ta} + V_{tb} + V_{tc}), \qquad (1)$$

where $V_{com}$, $V_{ta}$, $V_{tb}$, $V_{tc}$ are shown in FIG. 1. As discussed with respect to FIG. 3, the second zero vector V0(111) is employed when the terminal voltage vector $V_t$ is in the first region R1. This condition provides a common mode voltage of $$Vdc/2*(1+t_0/t_s). \qquad (2)$$

However, when the terminal voltage vector $V_t$ rotates into the second region R2, the switching pattern requires the use of the first zero vector V0(000), which generates a common mode voltage of $$Vdc/2*(1-t_0/t_s). \qquad (3)$$

Therefore the common mode voltage transition may be seen to be $$Vdc*(t_0/t_s). \qquad (4)$$

Such transitions will occur every 60 degree rotation of the terminal voltage vector $V_t$ or six times in a period of the three phase voltages.

Figure 5:
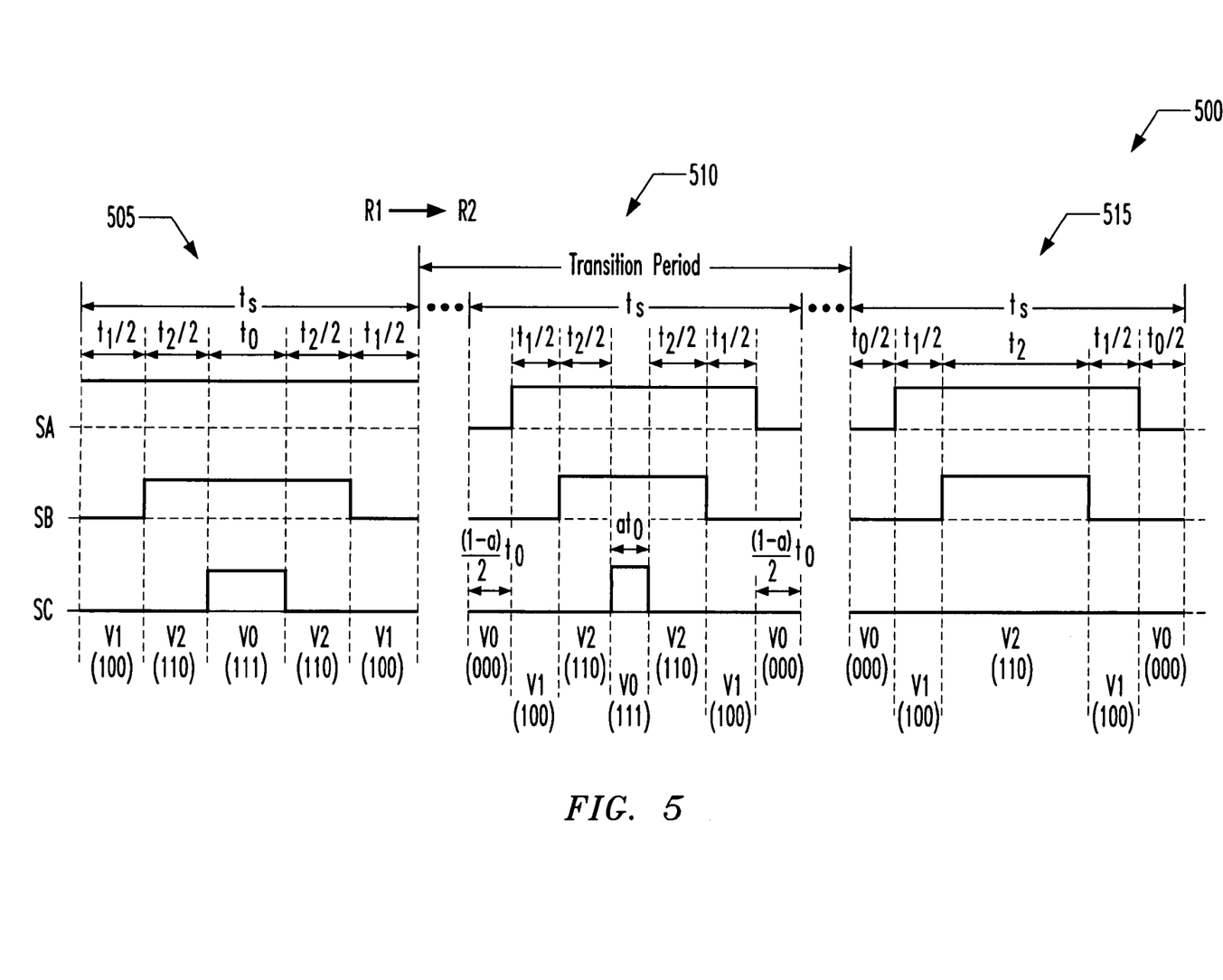
FIG. 5 illustrates a timing diagram showing vector patterns associated with PWM switching waveforms constructed in accordance with the principles of the present invention.

Turning now to FIG. 5, illustrated is a timing diagram showing vector patterns, generally designated 500, associated with PWM switching waveforms and constructed in accordance with the principles of the present invention. The timing diagram 500 includes a first set of PWM switching waveforms 505 associated with a first region R1, a transition set of PWM switching waveforms 510 associated with a common mode voltage transition period and a second set of PWM switching waveforms 515 associated with a second region R2 after the transition period has ended. The timing diagram 500 illustrates an example of a terminal voltage vector $V_t$ crossing from the first region R1 to the second region R2.

The PWM switching waveforms shown are associated with a set of first, second and third positive voltage switches of a three phase converter such as was discussed with respect to FIG. 1. A set of corresponding negative voltage switches would employ complementary PWM switching waveforms. A first switching vector V1(100), as indicated in the first set of PWM switching waveforms 505, dictates that the first positive voltage switch is conducting and that the second and third positive voltage switches are not conducting, as shown. This notation may be seen to apply for each of the switching vectors shown in the timing diagram 500.

An abrupt common mode voltage transition is caused by changing from one of the zero switching vectors to the other zero switching vector as the terminal voltage vector $V_t$ crosses from one region into another region. To soften the common mode voltage transition, a shaping function extends the common mode voltage transition over a period of time at the beginning of the second region R2. In the illustrated embodiment, this is accomplished by applying the shaping function to a shaped zero switching vector $V_0$ employing a combination of the first and second zero switching vectors V0(000), V0(111), which allows a gradual change over the transition period. The shaped zero switching vector $V_0$ may be expressed by:

$$V_0 = aV_0(111) + (1-a)V_0(000), \qquad (5)$$

where a shaping function a varies over the transition period to shape the common mode voltage transition during the transition period. Application of the shaped zero switching vector $V_0$ may be seen in the transition set of PWM switching waveforms 510.

Equation (5) provides a common mode voltage $V_{com}$ that may be written as:

$$V_{com} = \frac{V_{dc}}{2} + \left(a - \frac{1}{2}\right)V_{dc}\frac{t_0}{t_s}. \qquad (6)$$

Through careful selection of the shaping function a, change in the common mode voltage $V_{com}$ can be managed throughout the transition period. In the illustrated embodiment, the shaping function a provides either an increasing or decreasing step-wise linear extension of the transition period. This step-wise linear extension employs steps having widths that correspond to a switching period $t_s$ and a number of steps that correspond to the number of switching periods employed in the transition period.

As may be seen in FIG. 5, the shaping function a provides a three phase switching pattern during the transition period. When not in a transition period, however, the shaping function a provides non-transition shaping values of either one or zero (i.e., either a=1 or a=0) thereby maintaining a two phase switching pattern. The non-transition switching value of one is employed in first, third and fifth regions R1, R3, R5 thereby selecting the second zero switching vector V0(111) for the shaped zero switching vector $V_0$. Correspondingly, the non-transition switching value of zero is employed in second, fourth and sixth regions R2, R4, R6 thereby selecting the first zero switching vector V0(000) for the shaped zero switching vector $V_0$. The shaping function 410 of FIG. 4 reflects this embodiment.

Figure 6A:
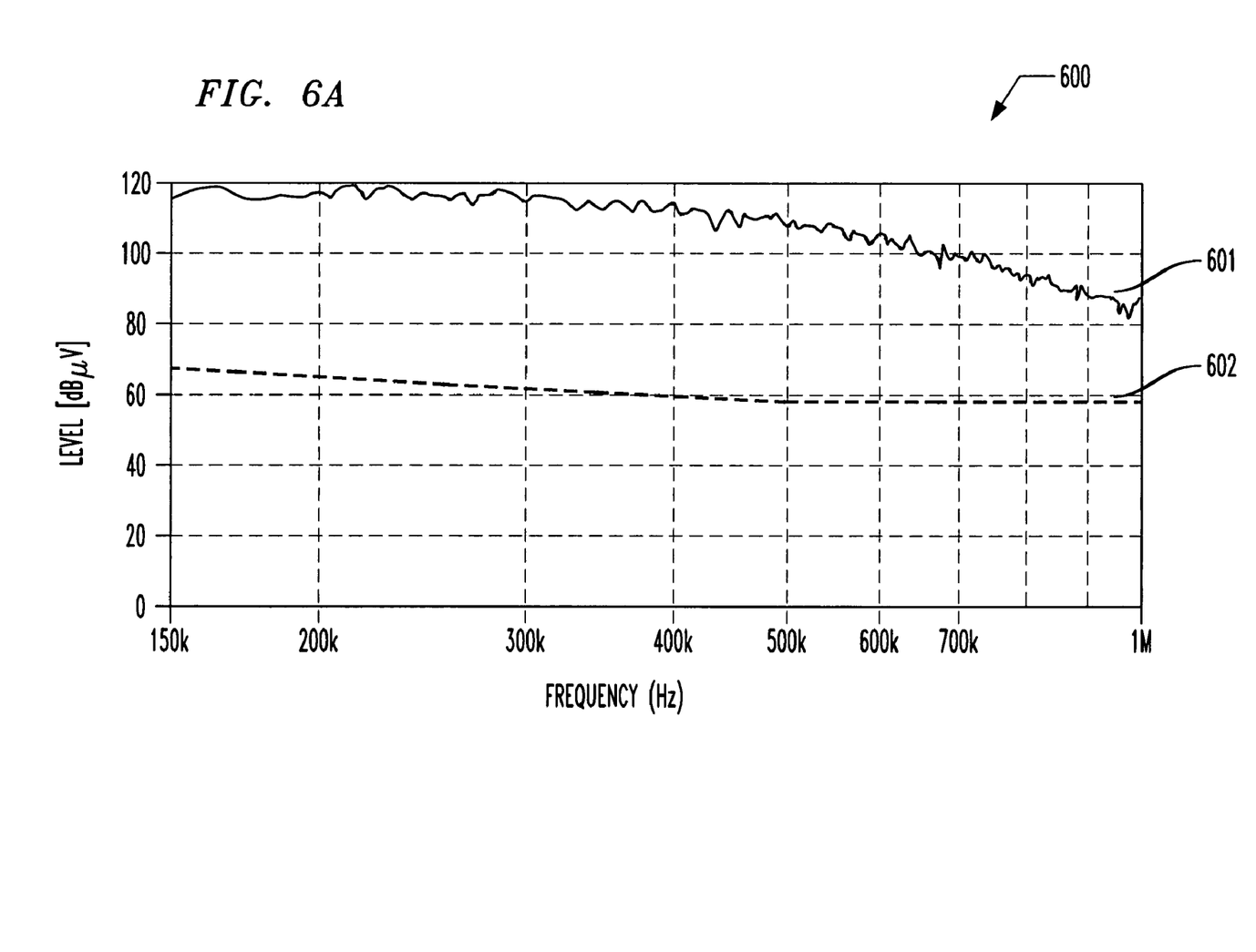
FIGS. 6A and 6B illustrate waveform diagrams providing EMI comparisons between an unshaped and a shaped common mode voltage.
Figure 6B:
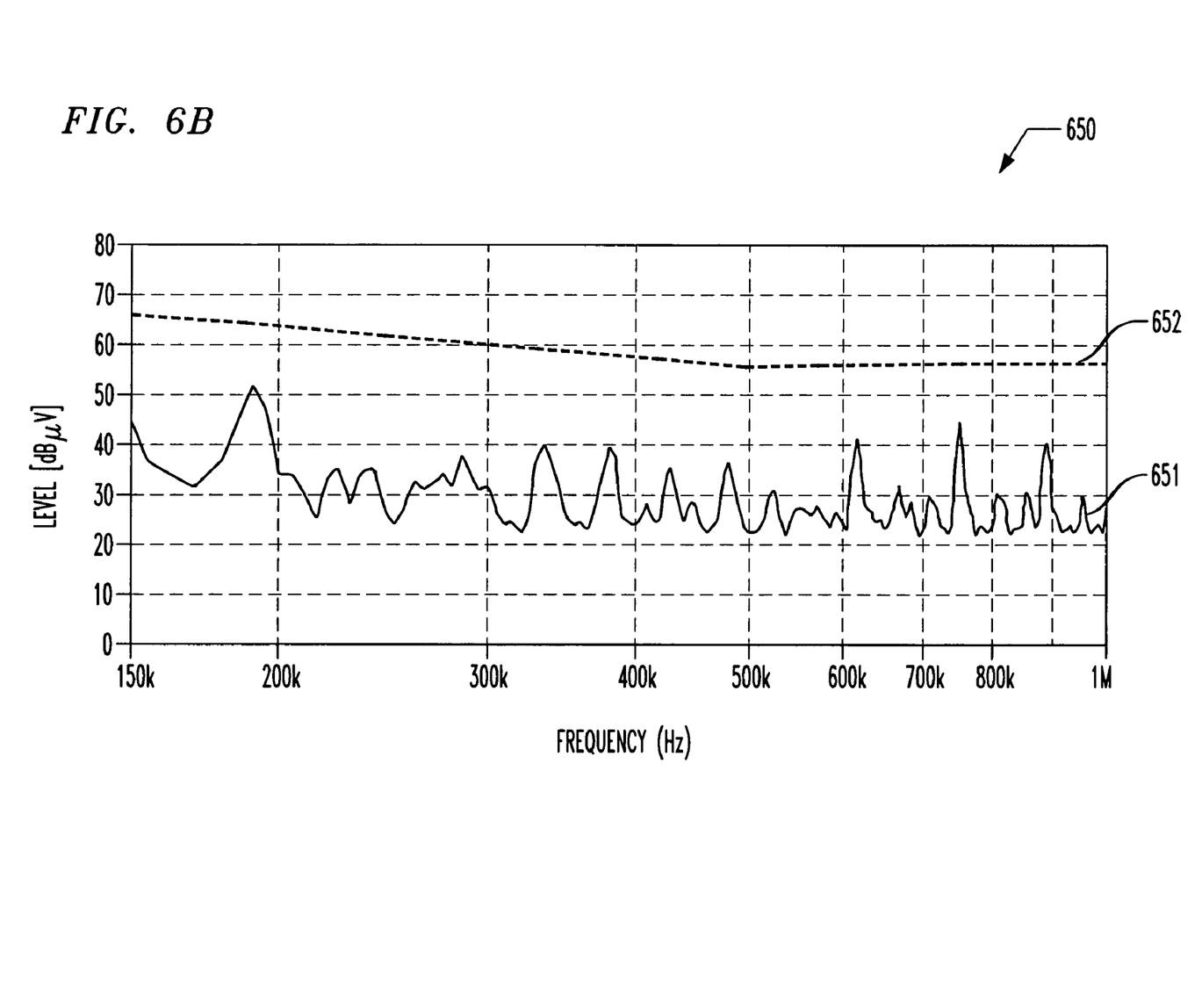

Turning now to FIGS. 6A and 6B, illustrated are waveform diagrams, generally designated 600, 650, providing EMI comparisons between an unshaped and a shaped common mode voltage. The waveform diagram 600 includes an unshaped common mode EMI test result 601 conducted employing two parallel-connected three phase converters as compared to an EMI requirement 602. Correspondingly, the waveform diagram 650 includes a shaped common mode EMI test result 651 conducted also employing the same parallel-connected three phase converters as compared to a correspondingly similar EMI requirement 652. Since the same hardware was employed for both EMI tests, the results demonstrate the effectiveness of a software-generated shaping function applied according to the principles of the present invention. The EMI associated with the shaped common mode voltage may be seen to be approximately 70 dB below that of the unshaped common mode voltage and well below the EMI requirement.

Figure 7:
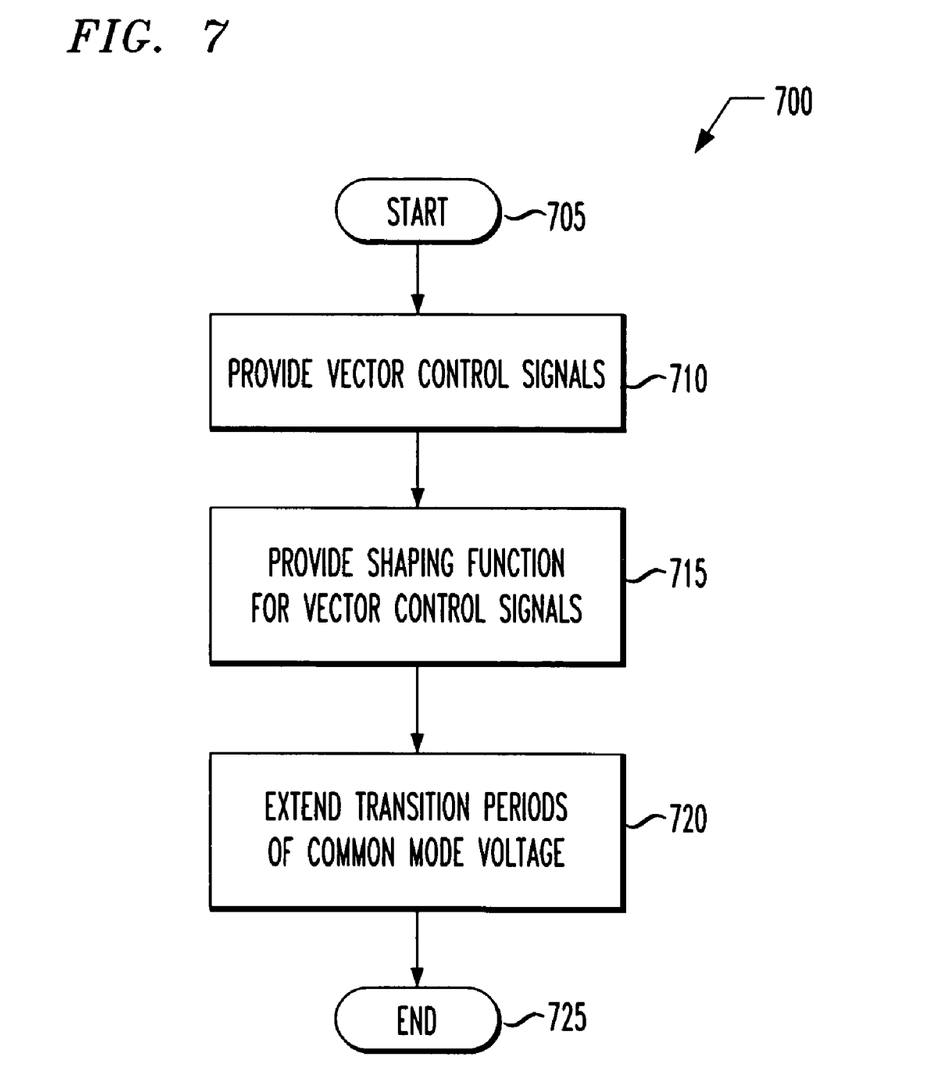
FIG. 7 illustrates a flow diagram of a method of controlling a common mode noise carried out in accordance with the principles of the present invention.

Turning now to FIG. 7, illustrated is a flow diagram of a method of controlling a common mode noise, generally designated 700, carried out in accordance with the principles of the present invention. The method 700 may be employed with a three phase converter and starts in a step 705. Then, in a step 710 vector control signals are provided for the three phase converter thereby generating a common mode voltage. In the illustrated embodiment, the vector control signals employ space vector pulse width modulation.

In a step 715, a shaping function for the vector control signals is provided. The general form of the shaping function provides portions that increase and decrease, which are connected by other portions that are substantially constant thereby corresponding overall to a desired waveform of a common mode voltage. The increasing and decreasing portions of the shaping function provide a step-wise linear extension of a transition period of the common mode voltage. Additionally, each step of the step-wise linear extension corresponds to a switching period of the vector control signals wherein a contiguous sequence of such switching periods extend the transition period of the common mode voltage in a step 720. The method 700 ends in a step 725.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a modulation controller, a method of controlling common mode noise and a three phase converter system employing the controller or the method have been presented. Advantages include the capability to greatly decrease a common mode noise associated with employing vector control signals in a three phase converter. The illustrated embodiments allow a software-generated shaping function to be applied to the vector control signals without having to modify the equipment or the configuration of the three phase converter. Although a specific three phase converter topology has been employed in the embodiments presented, the principles of the present invention have practical application in any three phase circuitry for resolving common mode noise issues.

Although the present invention has been described in detail, those skilled in the art should understand that they can make various changes, substitutions and alterations herein without departing from the spirit and scope of the invention in its broadest form.

What is claimed is:

1. A modulation controller for use with a three phase converter, comprising:
    a three phase modulator configured to provide vector control signals for said three phase converter that generate a common mode voltage; and
    a transition modifier coupled to said three phase modulator and configured to provide a shaping function for said vector control signals that extends a transition period of said common mode voltage.

2. The controller as recited in claim 1 wherein said vector control signals employ space vector pulse width modulation.

3. The controller as recited in claim 1 wherein said shaping function provides a stepwise linear extension of said transition period.

4. The controller as recited in claim 3 wherein each step of said stepwise linear extension corresponds to a switching period of said vector control signals.

5. The controller as recited in claim 1 wherein portions of said shaping function decrease, increase and remain substantially constant corresponding to a waveform of said common mode voltage.

6. The controller as recited in claim 1 wherein said transition period corresponds to a sector crossing of said vector control signals.

7. The controller as recited in claim 1 wherein extending said transition period reduces an electromagnetic interference (EMI) associated with said common mode voltage.

8. The controller as recited in claim 1 wherein said common mode voltage is provided between a DC voltage bus and an AC neutral point of said three phase converter.

9. A method of controlling a common mode noise for use with a three phase converter, comprising:
    providing vector control signals for said three phase converter that generate a common mode voltage; and
    further providing a shaping function for said vector control signals that extends a transition period of said common mode voltage.

10. The method as recited in claim 9 wherein said vector control signals employ space vector pulse width modulation.

11. The method as recited in claim 9 wherein said shaping function provides a stepwise linear extension of said transition period.

12. The method as recited in claim 11 wherein each step of said stepwise linear extension corresponds to a switching period of said vector control signals.

13. The method as recited in claim 9 wherein portions of said shaping function decrease, increase and remain substantially constant corresponding to a waveform of said common mode voltage.

14. The method as recited in claim 9 wherein said transition period corresponds to a sector crossing of said vector control signals.

15. The method as recited in claim 9 wherein extending said transition period reduces an electromagnetic interference (EMI) associated with said common mode voltage.

16. The method as recited in claim 9 wherein said common mode voltage is provided between a DC voltage bus and an AC neutral point of said three phase converter.

17. A three phase converter system, comprising:
    a three phase bidirectional converter; and
    a modulation controller coupled to said three phase bidirectional converter, including:
        a three phase modulator that provides vector control signals for said three phase bidirectional converter and generates a common mode voltage; and
        a transition modifier, coupled to said three phase modulator, that provides a shaping function for said vector control signals and extends a transition period of said common mode voltage.

18. The system as recited in claim 17 wherein said vector control signals employ space vector pulse width modulation.

19. The system as recited in claim 17 wherein said shaping function provides a stepwise linear extension of said transition period.

20. The system as recited in claim 19 wherein each step of said stepwise linear extension corresponds to a switching period of said vector control signals.

21. The system as recited in claim 17 wherein portions of said shaping function decrease, increase and remain substantially constant corresponding to a waveform of said common mode voltage.

22. The system as recited in claim 17 wherein said transition period corresponds to a sector crossing of said vector control signals.

23. The system as recited in claim 17 wherein extending said transition period reduces an electromagnetic interference (EMI) associated with said common mode voltage.

24. The system as recited in claim 17 wherein said common mode voltage is provided between a DC voltage bus and an AC neutral point of said three phase converter.

* * * * *